Oct. 17, 1950

F. W. McRAE 2,525,928

VALVE

Filed Jan. 20, 1947

INVENTOR.
FRED W. McRAE
BY Hazard & Miller
Attorneys

Patented Oct. 17, 1950

2,525,928

UNITED STATES PATENT OFFICE 2,525,928

VALVE

Fred W. McRae, Los Angeles, Calif.

Application January 20, 1947, Serial No. 723,104

2 Claims. (Cl. 251—154)

This invention relates to improvements in valves and particularly to that type of valve which is used on oxygen and acetylene tanks by oxy-acetylene welders. While the invention has been particularly designed to be embodied in valves of this character, it may be utilized in other valves where similar conditions occur.

In valves now conventionally used on oxygen and acetylene tanks there is a valve body having an inlet and an outlet between which there is a valve seat. A closure is moved toward and away from the valve seat by a rotatable stem that has a threaded connection with the body. In the conventional valve a bonnet is threadedly mounted on the valve body and fits about the valve stem. It frequently occurs that valves of this type are very difficult to operate and it not infrequently occurs that heavy wrenches are applied to the valve stem to rotate it to open the valve. When this occurs the bonnet is sometimes turned with the valve stem so that, while the intention may be to merely unscrew the valve stem and thus lift the closure from its seat, as a matter of fact the bonnet is turned with the valve stem and unscrews itself from the valve body. If the rotation is continued and the turning of the bonnet with the valve stem is not observed ultimately, the valve stem may completely unscrew itself from the body and the bonnet may also completely unscrew itself from the body. Under these circumstances, as there is nothing to retain the stem and valve closure in the body, the high pressures existing within the body of the valve are sufficient to force out the stem and valve closure with considerable force. A number of accidents have resulted in this manner.

An object of the present invention is to provide an improved valve of this character wherein the valve stem is threadedly mounted in the body and is adapted on rotation to move the valve closure toward or away from its seat and to provide a removable but extremely positive means for retaining the valve stem within the body at all times. In this manner even though heavy wrenches may be applied to the valve stem to open the valve, it is impossible to inadvertently unscrew the stem from the body to such an extent that it is detached therefrom and the internal pressure can expel the stem and valve closure from the body.

With the foregoing and other objects in view, which will be made manifest in the following detailed description and specifically pointed out in the appended claims, reference is had to the accompanying drawings for an illustrative embodiment of the invention, wherein:

Figure 1:
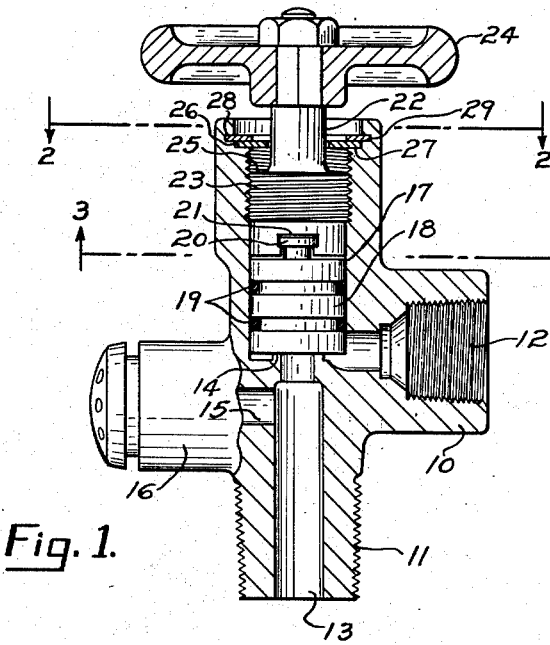
Figure 1 is a sectional view through the improved valve embodying the present invention.
Figure 2:
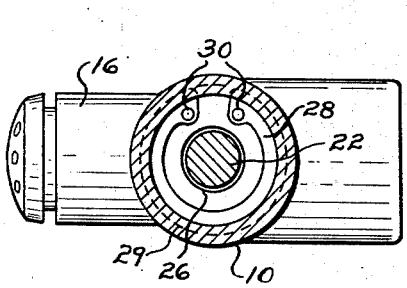
Fig. 2 is a horizontal section taken substantially upon the line 2—2 upon Fig. 1.
Figure 3:
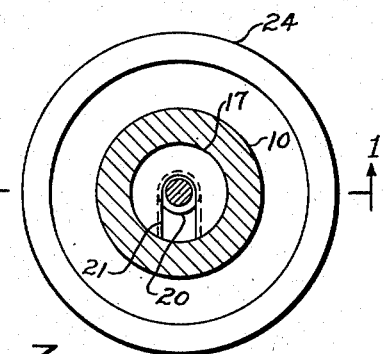
Fig. 3 is a horizontal section taken substantially upon the line 3—3 upon Fig. 1 in the direction indicated.

Referring to the accompanying drawings wherein similar reference characters designate similar parts throughout, the improved valve consists of a body 10 the bottom of which may be externally threaded as at 11 to screw into the top of an oxygen or an acetylene gas tank. The outlet from the body of the valve is indicated at 12 and the inlet thereto at 13. Between the inlet and outlet there is a valve seat 14.

Usually in valves of this character there is a passage 15 immediately below the valve seat 14 that leads to a pressure relief valve which may be housed within the lateral extension 16. As this pressure relief valve is optional in so far as the present invention is concerned and, if used, it conforms to conventional construction, its details are not illustrated herein. Above the valve seat 14 the body 10 has a cylindrical bore 17 within which there is movable a cylindrical closure 18. This closure is merely in the form of a cylinder that is externally grooved to accommodate one or more O-rings 19 that effectively seal the closure against leakage between the closure and the walls of the cylindrical bore 17. The bottom of the closure may or may not be provided with a recessed sealing means which actually engages the seat 14. At the top of the closure there is a T-shaped head 20 which is receivable in a radially extending T-shaped groove 21 on the bottom of the valve stem generally indicated at 22. This head thus forms a rotatable connection between the top of the closure and the bottom of the valve stem. The upper end of the cylindrical bore 17 is somewhat enlarged and internally threaded complementary to an enlarged threaded portion 23 on the valve stem. Thus, when the valve stem is rotated by means of its handle 24, it will be caused to screw upwardly or downwardly in the body 10 to advance or retract the closure 18 toward and away from its seat 14.

As will be observed from an inspection of Fig. 1, the O-rings are so positioned on the cylindrical closure that throughout all positions, from fully open position to fully closed position, the O-rings 19 will remain throughout their entire circumferences in contact with the cylindrical walls of the bore. In other words, when the valve is in its closed position the lowermost O-ring does not move downwardly beyond the end of the bore so as to be exposed opposite the outlet 12. Consequently a maximum seal is maintained between the exterior of the closure and the walls of the bore at all times during normal operation of the valve.

The enlarged threaded portion 23 presents an upwardly-facing shoulder 25 which is engageable with a ring 26 that is positioned against a shoulder 27 near the top of the body. This ring is retained against the shoulder 27 by means of a split expansion ring 28 which is partially recessed in an annular groove 29 above the shoulder 27. This expansion ring is preferably perforated as at 30 for the entry of the points of a contracting tool that can forcibly contract the ring against its normal tendency to expand to enable removal.

The ring 26 projects inwardly far enough to be opposed by and to be engageable by the shoulder 25 and is preferably unsplit. This ring may or may not fit rather closely about the reduced neck of the stem 22.

In the opening and closing of the closure 18 by the stem 22 the operation of the valve is somewhat conventional. However, when it is desired to open the valve, if the opening should become very stiff, requiring the application of a heavy wrench to the stem 22, it will be appreciated that it is impossible to completely detach or unscrew the threaded portion 23 from the threads on the interior of the body 10. Thus, when the valve is fully opened, the shoulder 25 will engage the under side of the ring 26 and regardless of any normal force applied to the stem 22 it is impossible to dislodge the ring 26 upwardly due to the retaining effect of the expansion ring 28. Consequently, with this valve it is impossible to inadvertently completely unscrew the stem from the body 10 which is an objection with prior valves employing bonnets around the stem having threaded connections with the exterior of the body. If it is desired at any time to remove the closure 18 for purposes of replacing the sealing rings 19 or to re-face the seat 14 or for any other purpose, it is possible to insert a contracting tool into the apertures 30 and to forcibly contract the split ring 28 to enable its removal from the groove 29. When the split ring is thus retracted, ring 26 can be removed and the stem and its closure withdrawn.

From the above described construction it will be appreciated that the improved valve is of relatively simple and durable construction and is so designed that accidental detachment of the parts is effectively prevented.

Various changes may be made in the details of construction without departing from the spirit and scope of the invention as defined by the appended claims.

I claim:

1. A valve comprising a body having an inlet and an outlet and a valve seat therebetween, there being a cylindrical bore in the body over the valve seat, a closure movable therein toward and away from the valve seat, the upper end of the bore being internally threaded, a threaded stem screwed into the upper end of the bore and connected to the closure whereby upon rotation of the stem the closure may be moved toward and away from its seat, said closure being externally grooved, O-rings in the grooves engaging the walls of the bore to prevent leakage around said closure, the top of the bore being enlarged to present an upwardly facing shoulder above the threaded portion thereof, a washer on the shoulder projecting inwardly over the threaded portion on the stem, and a split expansion ring over the washer partially recessed in the walls of the enlarged portion of the bore for retaining the washer against said shoulder whereby the upward opening movement of the stem will be limited by the engagement of the threaded portion of the stem with said washer.

2. A valve comprising a body having an inlet and an outlet and a valve seat therebetween, a cylindrical bore in the body over the valve seat, a closure movable in the bore toward and away from the valve seat, packing between the closure and the bore preventing leakage around the closure, said closure being insertable into the body through the upper end of said bore, the upper end of the bore being internally threaded, a threaded valve stem screwed into the threaded portion of the bore and connected to the closure whereby upon rotation of the valve stem the closure may be moved toward and away from said seat, said bore being enlarged above the threaded portion presenting an upwardly facing shoulder, the stem being reduced above the threaded portion thereon, a washer on the shoulder extending inwardly over the threaded portion on the stem, and a split expansion ring partially recessed in the walls of the bore above the threaded portion for retaining the washer against said shoulder and thus limiting upward movement of the stem.

F. W. McRAE.

REFERENCES CITED

The following references are of record in the file of this patent:

UNITED STATES PATENTS

| Number | Name | Date |
|---|---|---|
| 263,091 | Ashton | Aug. 22, 1882 |
| 597,024 | Schmitz | Jan. 11, 1898 |
| 974,498 | Kerbaugh | Nov. 1, 1910 |
| 1,508,102 | Holt | Sept. 9, 1924 |
| 1,510,528 | Sebenste | Oct. 7, 1924 |
| 1,552,159 | Holter | Sept. 1, 1925 |
| 1,624,186 | Ryan | Apr. 12, 1927 |
| 1,639,853 | Maanum | Aug. 23, 1927 |
| 1,741,983 | Ellberg | Dec. 31, 1929 |
| 1,864,250 | Lucas | June 21, 1932 |
| 2,010,088 | Kohler | Aug. 6, 1935 |
| 2,253,643 | Mueller | Aug. 26, 1941 |
| 2,314,683 | Berry | Mar. 23, 1943 |
| 2,360,733 | Smith | Oct. 17, 1944 |
| 2,372,631 | Stevenson | Mar. 27, 1945 |
| 2,414,908 | Smith | Jan. 28, 1947 |

FOREIGN PATENTS

| Number | Country | Date |
|---|---|---|
| 196,038 | Switzerland | Feb. 28, 1938 |